United States Patent Office 3,239,553
Patented Mar. 8, 1966

3,239,553
PROCESS FOR THE PRODUCTION OF GAMMA-HALONITRILES BY THE 1,2-ADDITION OF ALPHA-HALONITRILES TO OLEFINES
Frederick F. Rust, Orinda, and Harvey S. Klein, Berkeley, Calif., assignors to Shell Oil Company, New York, N.Y., a corporation of Delaware
No Drawing. Filed Aug. 12, 1963, Ser. No. 301,645
10 Claims. (Cl. 260—465.7)

This invention relates to an improved method for the production of γ-halonitriles. More particularly, it relates to an improved method for the addition of α-halonitriles to olefins.

Methods are available for the addition of α-halonitriles to olefins. U.S. 2,615,915 to Ladd describes a peroxide-catalyzed addition of trichloroacetonitrile to ethylene to produce, inter alia, 2,2,4,-trichlorobutyronitrile. Related methods are available for the addition of mono- and dibromoacetonitrile to olefinic materials. Such peroxide-catalyzed methods, although producing 1:1 addition product, frequently result in the production of telomers containing more than one olefinic moiety per halonitrile moiety as major if not principal reaction products.

It is the object of this invention to provide an improved method for the production of halogen-containing nitriles. More particularly, it is an object to provide an improved process for the 1,2-addition of α-halonitriles to olefins, which process results in the essentially exclusive production of 1:1 addition products.

It has now been found that these objects are accomplished by the 1,2-addition of α-mono- to α,α,α-trihalo-nitriles to olefin in the presence of certain metallic compounds as catalysts. By the term "olefin" as employed herein is meant hydrocarbyl olefins and substituted hydrocarbyl olefins.

The compounds which have been found to be useful catalysts for the process of the invention are compounds of iron, particularly salts comprising iron cations, either in the ferrous or ferric oxidation state, and simple anions, organic or inorganic. Although iron compounds such as the nitrate, sulfate, bisulfate, acetate and the like are operable, best results are obtained when the catalyst employed is a halide, e.g., fluoride, chloride, bromide or iodide. Preferred are iron halides wherein the halogen has an atomic number of 17 to 53, i.e., the halogens chlorine, bromine or iodine. Although ferrous salts are generally preferred over the corresponding ferric salt, in most cases, ferric salts give satisfactory results. Particularly preferred as catalyst for the process of the invention is ferrous chloride.

The iron compounds are employed in catalytic amounts. While the optimum amount of catalyst will depend upon the particular olefin, α-halonitrile and iron compound employed, amounts of catalyst from about 0.005 mole to about 0.5 mole per mole of limiting reactant are generally satisfactory, while amounts of catalyst from about 0.05 mole to about 0.2 mole per mole of limiting reactant are preferred.

The halonitrile reactant contains from 1 to 3 halogen substituents on the carbon atom alpha to the cyano substituent. Preferred halonitriles are primary mono-nitriles, that is, contain a single cyano substituent which is attached to a primary carbon atom, are halohydrocarbon nitriles containing only atoms of hydrogen, carbon and halogen in addition to the nitrogen moiety of the cyano group, contain from 2 to 10 carbon atoms and are represented by the formula

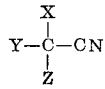

wherein X is halogen, Y represents hydrogen or X, and Z represents Y or is an aliphatic organic radical.

In the above-depicted formula, X represents halogen, e.g., fluorine, chlorine, bromine and iodine. Preferred X groups, however, are halogens having an atomic number from 17 to 53. Particularly preferred as halogen in the halonitrile reactant is chlorine.

When the term Z represents an aliphatic organic radical, it is preferred that Z contain from 1 to 8 carbon atoms. Suitable Z radicals are preferably acyclic and are preferably saturated, containing no ethylenic or acetylenic unsaturation. The Z group may be hydrocarbyl or substituted hydrocarbyl, but when substituted it is preferred that the Z group be halohydrocarbyl. Preferred aliphatic organic Z radicals are therefore generically designated as saturated (halo)hydrocarbyl radicals. Illustrative saturated hydrocarbyl Z radicals include alkyl radicals such as methyl, ethyl, propyl, butyl, isobutyl, amyl, hexyl and 2-ethylhexyl radicals, as well as haloalkyl radicals such as 2-chloroethyl, 4-bromobutyl, 6-chlorohexyl, 3-iodooctyl, 2-chloropropyl and 5-bromo-2-hexyl.

As the preferred halonitrile reactants in the process of the invention are haloacetonitriles, most preferred are the compounds wherein Z is hydrogen or halogen, i.e., the Y group in the above-depicted formula. Illustrative of the most preferred halonitrile reactants are chloroacetonitrile, dichloroacetonitrile, trichloroacetonitrile and the corresponding bromo and iodo derivatives.

The halonitrile is reacted with an olefin. By olefin is meant an organic compound possessing one or more carbon-carbon double bonds that are not conjugated with other non-aromatic unsaturation. Suitable olefins have from 2 to 20 carbon atoms and from 1 to 3 isolated, i.e., non-conjugated, carbon-carbon double bonds. The olefin is cyclic or acyclic, and is hydrocarbyl, that is, contains only atoms of carbon and hydrogen, or is substituted hydrocarbyl containing non-hydrocarbyl substitutents such as cyano, acyl, carboalkoxy, carboaryloxy, alkoxy, halo, nitro, formyl, dialkylamino, sulfo, sulfonyl and the like. The olefinic linkage(s) may be terminal or internal, or both if more than one olefinic linkage is present. The olefin may be wholly aliphatic, including cycloaliphatic, or may contain aromatic moieties, but preferably contains no acetylenic unsaturation. In addition, the olefinic linkage may be present in a moiety serving as a monomer in a polymeric material, e.g., the remaining isolated olefinic linkage in a butadiene, isoprene, chloroprene or styrene-butadiene polymer.

Illustrative acyclic olefins include ethylene, propylene, 1-butene, 2-butene, isobutylene, 1-hexene, 1-octene, biallyl, 1,7-octadiene, 1,4-dichloro-2-butene, styrene, allylbenzene, 1,4-diallylnaphthalene, propenylbenzene, allyl acetate, allyl benzoate, allyl chloride, propenyl acetate, vinylcyclohexane, 3-vinylpyridine, N-vinylbutyrolactam, 2-bromo-3-heptene, 6-fluoro-1-nonene, 3-butenyl methyl ketone, p-nitrostyrene, m-dimethylaminostyrene, 1-phenyl-3-hexene, propenyl benzoate, diallyl ether, diallyl sulfide, bis(4-octenyl)sulfone, dimethyl β-chlorovinyl phosphate, and nonyl 3-butenyl ether. Cyclic olefins are those olefins containing at least one carbon atom of at least one olefinic linkage as a member of a cyclic ring, which ring may be carbocyclic or heterocyclic. Suitable cyclic olefins include cyclohexene, cyclopentene, 1,4-cyclohexadiene, cyclooctene, 2,3-dipropylcyclohexene, 4-chlorocyclohexene, 4-methylenecyclohexene, 3-methylcyclopentene, 1,5-cyclooctadiene, bicycloheptadiene, pinene, dipentene, camphene, 5,6-dihydro-2H-pyran, N-ethyl-3-methylenepiperidine, 2-butenolactone, dihydrofuran, and sulfolene.

Preferred olefins are hydrocarbon olefins, halohydrocarbon olefins or hydrocarbenyl esters having from 2 to 10 carbon atoms. Further preferred are acyclic hydrocarbon monoolefins, particularly those monoolefins wherein the olefinic linkage is terminal.

The halonitrile and olefin are employed in any convenient ratio, as an excess of either does not appear to be detrimental to the process of the invention. The optimum ratio of halonitrile to olefin will in part be dependent upon the functionality of the olefin reactant, that is, the number of isolated carbon-carbon double bonds it contains, as more than one molecule of halonitrile may react with an olefin containing more than one olefinic linkage. Molar ratios of halonitrile reactant to olefinic linkage from about 5:1 to about 1:5 are generally satisfactory, while molar ratios of halonitrile reactant to olefinic linkage of from about 2:1 to about 1:2 are preferred. Frequently, satisfactory results are obtained when the reactants are employed in amounts that are substantially stoichiometric, that is, a molar ratio of halonitrile to olefinic linkage of about 1:1.

The process of the invention is conducted in liquid phase solution. Solvents that are satisfactory are liquid at reaction temperature and pressure, are capable of dissolving the reactants and are substantially inert towards the halonitrile and olefin reactants and the products obtained therefrom. Preferred solvents are polar, that is, contain uneven charge distribution. Illustrative solvents include the alcohols, particularly lower monohydric and polyhydric alkanols such as methanol, ethanol, butanol, tert-butanol, 2-ethylhexanol, glycerol, ethylene glycol, and 1,2,6-hexanetriol, as well as the ether-alcohols, e.g., the Cellosolves and the Carbitols; the lower alkyl nitriles such as acetonitrile, propionitrile and butyronitrile; esters such as ethyl acetate, methyl propionate and propyl butyrate; sulfones such as diethyl sulfone, propyl hexyl sulfone and sulfolane; and N,N-dialkylamides such as dimethylformamide and N,N-diethylacetamide. Preferred solvents comprise the nitriles, especially cyanoalkanes, and particularly preferred as reaction solvent is acetonitrile.

The reaction process is conducted at atmospheric, subatmospheric or superatmospheric pressure so long as the reaction mixture is maintained substantially in the liquid phase. Advantageous use is made of the pressures generated when the reaction mixture is heated to reaction temperature in a sealed reaction vessel, which pressures will be somewhat but not substantially higher than atmospheric pressure. The process of the invention is conducted over a wide range of temperatures. Temperatures from about 50° C. to about 200° C. are generally satisfactory. The optimum reaction temperature will in part depend upon the type of halonitrile reactant employed, particularly upon the number of alpha-halogen substituents thereupon. Preferred reaction temperatures when trihaloacetonitrile reactants are employed range from about 75° C. to about 120° C., while the preferred temperature range for the reaction of α,α-dichloronitriles is from about 100° C. to about 140° C., and best results are obtained when the halonitrile reactant possesses a single α-halogen substituent if temperatures from about 110° C. to about 170° C. are employed. A somewhat special case exists when the olefin reactant possesses halogen substituents that are vinylic or allylic to the olefinic unsaturation. Although such olefins are operable and generally satisfactory results are obtained when such olefins are employed, somewhat more vigorous reaction conditions are required. Typically, reaction temperatures of about 10° C. to 20° C. higher and reaction times of 4 to 8 hours longer are required to give optimum results than when the corresponding non-halogenated olefin is employed.

The process of the invention is conducted by mixing the reactants, solvent and catalyst, and maintaining the reaction mixture at reaction temperature until reaction is complete, typically from about 4 to about 25 hours. The method of mixing is not material. One reactant may be gradually added to the other, as by bubbling a gaseous olefin into a mixture of halonitrile, solvent and catalyst, although it is equivalently useful to initially mix the entire amount of reactants. Subsequent to reaction, the product mixture is separated by conventional means, such as by fractional distillation, selective extraction or crystallization.

The products of the process of the invention are γ-halonitriles illustratively formed by cleavage of the bond between an alpha-halogen substituent and the alpha carbon atom of the halonitrile reactant and subsequent, 1,2-addition of the species thus formed to the olefin. An illustrative reaction process is shown below.

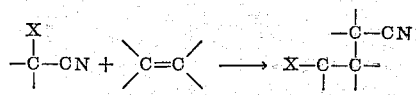

wherein X has the previously stated significance.

Illustrative products obtained by the addition of α-monohalonitriles include 4-chlorobutyronitrile, 3-chloro-1-cyano-3-methylbutane, 2-chloro-1-(cyanomethyl)cyclohexane, 2-bromo-1-(cyanomethyl)cyclopentane, 3-chloro-1-cyanononane, 3,6-dichloro-1,8-dicyanooctane, 1,2-dichloro-4-cyanobutane, 1-cyano-2-methyl-3-iodobutane and 2-bromo-4-cyanobutyl benzoate.

Exemplary products derived from reaction of an olefin with an α,α-dihalonitrile include 1-cyano-1,3-dichloro-2-methylbutane, 1-cyano-1,3-dibromononane, 2-chloro-1-(chlorocyanomethyl)cyclohexane, 5-cyano-3,5-dichloroamyl acetate, 2,4-dichloro-4-phenylbutyronitrile and 2-iodo-1-(iodocyanomethyl)cyclooctane.

When trihalonitrile is reacted with olefin, illustrative products include 1-cyano-1,1,3-trichloroheptane, 2-bromo-1-(dibromocyanomethyl)cyclopentane, 2,2,4-trichloro-4-phenylbutyronitrile, 5-cyano-3,5,5-triiodoamyl propionate, 1-cyano-2-methyl-1,1,3-trichloropentane and 1-cyano-2-chloromethyl-1,1,3,4-tetrachlorobutane.

The compounds of the invention find particular utility as chemical intermediates. The halogen substituents may be reacted with tertiary amines to form useful quaternary ammonium salts, with sodium hydrosulfide to form the corresponding thiol derivatives, with alkoxides or phenoxides to form ethers, with salts of carboxylic acids to form esters, or may be reacted with ammonia to replace the halogen by an amino radical and the amino nitrile is subsequently hydrolyzed to an amino acid. The halonitrile products may be dehydrohalogenated to produce unsaturated nitriles which are useful in the production of polymeric material, or alternatively the unsaturated linkage may be epoxidized to form useful epoxy resin precursors. The halonitriles and the corresponding haloacids, obtained by hydrolysis of the nitrile group, find additional utility as agricultural chemicals.

To further illustrate the process of the invention, the following examples are provided. It should be understood that they are not to be regarded as limitations, as the teachings thereof may be varied as will be understood by one skilled in this art.

*Example I*

To a glass tube was charged 7.1 g. of chloroacetonitrile, 7 g. of 1-pentene, 1 g. of ferrous chloride, and 15 ml. of acetonitrile. The tube was sealed and the reaction mixture heated at 120° C. overnight. The tube was cooled and opened, and the solvent and unreacted starting material removed by distillation. The product, 3-chloro-1-cyanohexane, B.P. 227° C., $n_D^{25}$ 1.4448, was obtained in 100% yield based upon a 24% conversion. The infrared spectrum, contained a band characteristic of the nitrile group, and the nuclear magnetic resonance spectrum was consistent with the structure 3-chloro-1-cyanohexane.

|  | Anal. Calc. | Found |
|---|---|---|
| C, percent wt | 57.8 | 57.3 |
| H, percent wt | 8.3 | 8.4 |
| Cl, percent wt | 24.4 | 24.3 |

*Example II*

Following the procedure of Example I, 7.0 g. of trichloroacetonitrile was reacted with 3.5 g. of 1-pentene in 10 ml. of acetonitrile in the presence of 0.5 g. ferrous chloride at 105° C. overnight. The product, 1-cyano-1,1,3-trichlorohexane, B.P. 224° C., $n_D^{25}$ 1.4668, was obtained in quantitative yield based upon an 85% conversion. The nuclear magnetic resonance spectrum was consistent with the above structure, and mass spectroscopy indicated an empirical formula of $C_7H_{10}Cl_3N$.

Related results are obtained when ferric chloride is employed as catalyst.

*Example III*

Following the procedure of Example I, 1.4 g. of styrene was heated with 1.5 g. of dichloroacetonitrile in 2.5 acetonitrile in the presence of 0.15 g. of ferrous chloride for six hours at 115° C. and overnight at 95° C. The product, 2,4-dichloro-4-phenylbutyronitrile, was obtained in essentially quantitative yield based upon a conversion of approximately 40%. The product had a refractive index, $n_D^{25}$, of 1.5422, and decomposed at 240° C. The infrared spectrum contained a band characteristic of a mono-substituted benzene ring, and the nuclear magnetic resonance spectrum was consistent with the above formula.

|  | Anal. Calc. | Found |
|---|---|---|
| C, percent wt | 56.0 | 57.4 |
| H, percent wt | 4.2 | 4.5 |
| Cl, percent wt | 33.2 | 30.5 |

*Example IV*

By a procedure similar to that of Example III, 1.5 g. of dichloroacetonitrile was heated with 0.95 g. of 2-pentene for 6 hours at 115° C. and overnight at 95° C. The product was obtained in approximately 100% yield based upon a 62% conversion, B.P. 225° C., $n_D^{25}$ 1.4669. Mass spectroscopy indicated an empirical formula of $C_{10}H_{11}Cl_2N$, and the nuclear magnetic resonance spectrum was consistent with a mixture of the isomers 1-cyano-1,3-dichloro-2-methylpentane and 1-chloro-2-(1-chloroethyl)-1-cyanobutane.

|  | Anal. Calc. | Found |
|---|---|---|
| C, percent wt | 46.6 | 47.0 |
| H, percent wt | 6.1 | 6.3 |
| Cl, percent wt | 39.4 | 38.5 |
| N, percent wt | 7.8 | 7.6 |

*Example V*

To a glass tube was charged 1.35 g. of allyl acetate, 1.5 g. of dichloroacetonitrile, 2.5 ml. of acetonitrile and 0.15 g. of ferrous chloride. The tube was sealed and the reaction mixture was maintained at 115° C. for 2 hours, at 95° C. overnight, and for 6 additional hours at 115° C. The tube was cooled and opened and the solvent and unreacted starting material removed to give a mixture of the isomers 2,4-dichloro-4-cyanobutyl acetate (major) and 3-chloro-2-chloromethyl-3-cyanopropyl acetate (minor), $n_D^{25}$ 1.4670, decomposition at 273° C., obtained in approximately 100% yield based upon a conversion of 43%.

|  | Anal. Calc. | Found |
|---|---|---|
| C, percent wt | 40.0 | 42.0 |
| H, percent wt | 4.3 | 4.6 |
| Cl, percent wt | 33.9 | 33.3 |

*Example VI*

By a procedure similar to that of Example V, 1.1 g. of cyclohexene was reacted with 1.5 g. dichloroacetonitrile in 2.5 ml. of acetonitrile in the presence of 0.15 g. of ferrous chloride. The reaction mixture was maintained at 115° C. for 2 hours, overnight at 95° C., and for 4 additional hours at 115° C. A mixture of isomeric products, 50% yield based upon cyclohexene, was obtained. One isomer, $n_D^{25}$ 1.4995, decomposition at 250° C., which constituted 55.2% of the product mixture, had a nuclear magnetic resonance spectrum consistent with the structure 2-chloro-1-(chlorocyanomethyl) cyclohexane. The isomeric product mixture is believed to be composed of three stereoisomers.

*Example VII*

Following the procedure of Example V, 1.05 g. of allyl chloride was heated with 1.5 g. of dichloroacetonitrile in 2.5 ml. of acetonitrile in the presence of 0.15 g. of ferrous chloride for 2 hours at 115° C., overnight at 95° C., and for 6 additional hours at 115° C. A 99% yield of trichloropentanonitrile product based up on a 22% conversion was obtained, $n_D^{25}$ 1.4910, decomposition at 250° C.

|  | Anal. Calc. $C_5H_6Cl_3N$ | Found |
|---|---|---|
| C, percent wt | 32.2 | 32.6 |
| H, percent wt | 3.2 | 3.5 |
| Cl, percent wt | 57.1 | 56.2 |

*Example VIII*

When 1-butene is reacted with tribromoacetonitrile in tertiary butyl alcohol solution in the presence of ferrous bromide, a good yield of 1-cyano-1,1,3-tribromopentane is obtained.

We claim as our invention:

1. The process for the production of γ-halonitriles by the 1,2-addition of α-mono- to α,α,α-trihalonitriles having from 1 to 3 halogen substituents of atomic number from 17 to 53 and from 2 to 10 carbon atoms to an olefinic compound having from 2 to 20 carbon atoms and from 1 to 3 isolated carbon-carbon double bonds in the presence of from about 0.005 mole to about 0.5 mole per mole of limiting reactant of an iron salt, at a temperature from about 50° C. to about 200° C.

2. The process of claim 1 wherein the iron salt is an iron halide.

3. The process for the production of γ-halonitriles by the 1,2-addition of a compound of the formula

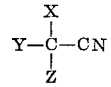

wherein X is halogen, having an atomic number from 17 to 53, Y is selected from the group consisting of hydrogen and X, and Z is selected from the group consisting of Y and saturated (halo)hydrocarbyl radicals having 1 to 8 carbon atoms wherein any halogen has an atomic number from 17 to 53, to an olefinic compound having 2 to 20 carbon atoms and from 1 to 3 isolated carbon-carbon double bonds in the presence of from about 0.005 mole to about 0.5 mole per mole of limiting reactant of iron salt, at a temperature from about 50° C. to about 200° C.

4. The process of claim 3 wherein the iron salt is ferrous halide.

5. The process for the production of γ-chloronitriles by the 1,2-addition of mono- to trichloroacetonitrile to acyclic hydrocarbon monoolefin having 2 to 10 carbon atoms in the presence of from about 0.005 mole to about 0.5 mole per mole of limiting reactant of ferrous chloride.

6. The process of claim 5 wherein the acyclic monoolefin is 1-pentene.

7. The process of claim 5 wherein the acyclic monoolefin is styrene.

8. The process of claim 7 wherein the chloronitrile is dichloroacetonitrile.

9. The process of claim 5 wherein the acyclic monoolefin is ethylene.

10. The process of claim 9 wherein the chloronitrile is monochloroacetonitrile.

References Cited by the Examiner

FOREIGN PATENTS 503,792  6/1954  Canada.
503,205  9/1937  Great Britain.

OTHER REFERENCES

Cowen: Journal of Organic Chemistry, March 1955, volume 20, No. 3, pp. 287–294.

CHARLES B. PARKER, *Primary Examiner*.

DALE R. MAHANAND, *Assistant Examiner*.